United States Patent
King et al.

(10) Patent No.: US 8,487,582 B2
(45) Date of Patent: *Jul. 16, 2013

(54) APPARATUS FOR TRANSFERRING ENERGY USING ONBOARD POWER ELECTRONICS AND METHOD OF MANUFACTURING SAME

(75) Inventors: Robert Dean King, Schenectady, NY (US); Robert Louis Steigerwald, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/099,053

(22) Filed: May 2, 2011

(65) Prior Publication Data
US 2011/0204854 A1 Aug. 25, 2011

Related U.S. Application Data

(63) Continuation of application No. 12/550,504, filed on Aug. 31, 2009, now Pat. No. 8,030,884.

(51) Int. Cl.
*H02J 7/14* (2006.01)
*H02J 7/04* (2006.01)
*H02J 5/00* (2006.01)
*H02P 1/00* (2006.01)

(52) U.S. Cl.
USPC .............. 320/104; 320/140; 307/45; 318/139

(58) Field of Classification Search
USPC ....................... 320/104, 140; 307/45; 318/139
See application file for complete search history.

(56) References Cited

U.S. PATENT DOCUMENTS

| | | | |
|---|---|---|---|
| 5,132,604 A * | 7/1992 | Shimane et al. | 322/10 |
| 5,373,195 A | 12/1994 | De Doncker et al. | |
| 5,589,743 A | 12/1996 | King | |
| 5,903,449 A | 5/1999 | Garrigan et al. | |
| 6,118,678 A * | 9/2000 | Limpaecher et al. | 363/60 |
| 6,331,365 B1 | 12/2001 | King | |
| 6,737,822 B2 | 5/2004 | King | |
| 7,049,792 B2 | 5/2006 | King | |
| 7,499,296 B2 | 3/2009 | Baudesson et al. | |
| 7,595,597 B2 | 9/2009 | King et al. | |
| 7,750,501 B2 | 7/2010 | Huang | |
| 7,960,865 B2 | 6/2011 | Jahkonen | |
| 2002/0051368 A1 | 5/2002 | Ulinski et al. | |
| 2007/0012492 A1 | 1/2007 | Deng et al. | |

* cited by examiner

*Primary Examiner* — M'Baye Diao
(74) *Attorney, Agent, or Firm* — Ziolkowski Patent Solutions Group, SC; Jean K. Testa

(57) ABSTRACT

An apparatus comprises a first energy storage device configured to output a DC voltage, a first bi-directional voltage modification assembly coupled to the first energy storage device, and a charge bus coupled to the first energy storage device and to the first bi-directional voltage modification assembly. The apparatus also comprises high-impedance voltage source coupleable to the charge bus and a controller configured to monitor a transfer of charging energy supplied from the high-impedance voltage source to the first energy storage device. The controller is also configured to compare the monitored transfer of charging energy with a threshold value and, after the threshold value has been crossed, control the first bi-directional voltage modification assembly to modify one of a voltage and a current of the charging energy supplied to the first energy storage device.

24 Claims, 3 Drawing Sheets

APPARATUS FOR TRANSFERRING ENERGY USING ONBOARD POWER ELECTRONICS AND METHOD OF MANUFACTURING SAME

CROSS-REFERENCE TO RELATED APPLICATION

The present application is a continuation of and claims priority to U.S. patent application Ser. No. 12/550,504 filed Aug. 31, 2009, the disclosure of which is incorporated herein.

BACKGROUND OF THE INVENTION

Embodiments of the invention relate generally to electric drive systems including hybrid and electric vehicles and to stationary drives that are subject to transient or pulsed loads and, more particularly, to transferring energy between an electrical storage device of the vehicle or drive and a power source external to the vehicle or drive.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Plug-in electric vehicles, whether of the hybrid electric type or of the purely electric type, are configured to use electrical energy from an external source to recharge the traction battery. Such vehicles may include on-road and off-road vehicles, golf cars, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery. Plug-in vehicles may include circuitry and connections to facilitate the recharging of the fraction battery from the utility grid or other external source, for example. The battery charging circuitry, however, may include dedicated components such as boost converters, high-frequency filters, choppers, inductors, and other electrical components dedicated only to transferring energy between the on-board electrical storage device and the external source. These additional dedicated components add extra cost and weight to the vehicle.

It would therefore be desirable to provide an apparatus to facilitate the transfer of electrical energy from an external source to the on-board electrical storage device of a plug-in vehicle that reduces the number of components dedicated only to transferring energy between the on-board electrical storage device and the external source.

BRIEF DESCRIPTION OF THE INVENTION

According to one aspect of the invention, an apparatus comprises a first energy storage device configured to output a DC voltage, a first bi-directional voltage modification assembly coupled to the first energy storage device, and a charge bus coupled to the first energy storage device and to the first bi-directional voltage modification assembly. The apparatus also comprises high-impedance voltage source coupleable to the charge bus and a controller configured to monitor a transfer of charging energy supplied from the high-impedance voltage source to the first energy storage device. The controller is also configured to compare the monitored transfer of charging energy with a threshold value and, after the threshold value has been crossed, control the first bi-directional voltage modification assembly to modify one of a voltage and a current of the charging energy supplied to the first energy storage device.

In accordance with another aspect of the invention, a method comprises coupling a battery to a first voltage bus, the battery configured to output a DC voltage, coupling a first bi-directional voltage modification assembly to the first voltage bus and coupling a second voltage bus to the first voltage bus, the second voltage bus configured to receive charging energy from a high-impedance voltage source and to supply the charging energy to one of the first bi-directional voltage modification assembly and the first voltage bus. The method also comprises configuring a controller to monitor a transfer of the charging energy to the battery, compare the monitored transfer of charging energy with a threshold value, and, after the threshold value has been crossed, control the first bi-directional voltage modification assembly to modify one of a voltage and a current of the charging energy supplied to the battery.

In accordance with yet another aspect of the invention, a system comprises a charge bus configured to receive charging energy from a voltage source, an energy storage device configured to output a DC voltage and coupled to the charge bus, a first bi-directional voltage modification assembly coupled to the charge bus and a controller. The controller is configured to monitor a transfer of the charging energy supplied to the energy storage device, compare the monitored transfer of charging energy with a threshold comprising one of a voltage of the energy storage device and an average rectified line voltage of the charge bus, and, after the threshold has been crossed, control the first bi-directional voltage modification assembly to modify one of a voltage and a current of the charging energy supplied to the first energy storage device.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
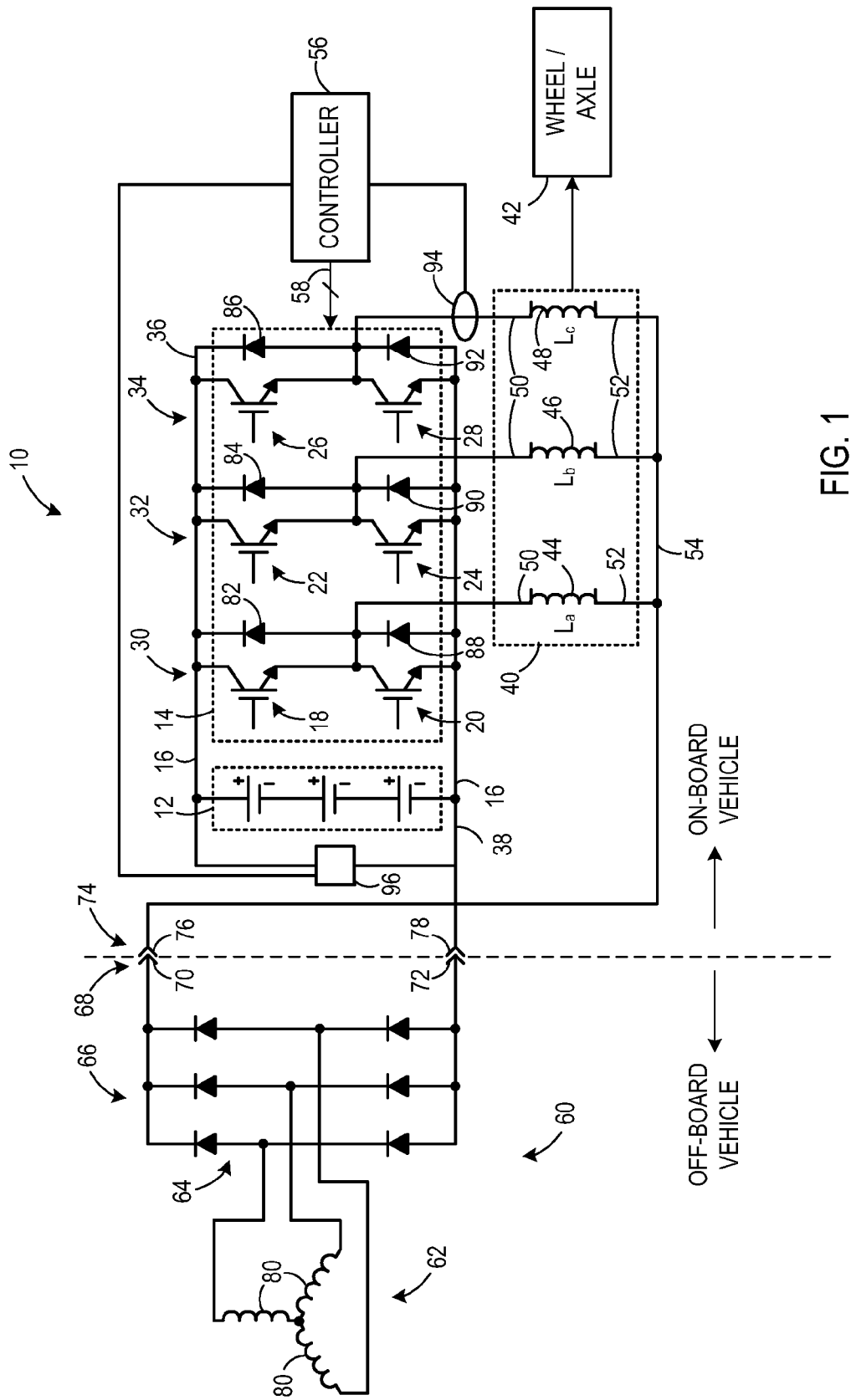
FIG. 1 is a schematic diagram of a fraction system according to an embodiment of the invention.

FIG. 1 is a schematic diagram of a traction system 10 according to an embodiment of the invention. Traction system 10 includes a first energy storage device 12. In one embodiment, first energy storage device 12 is a high-voltage energy storage device and may be a battery, a flywheel system, fuel cell, an ultracapacitor, or the like. First energy storage device 12 is coupled to a bi-directional voltage modification assembly 14 via a DC bus 16. In one embodiment, bi-directional voltage modification assembly 14 is a bi-directional DC-to-AC voltage inverter. Bi-directional DC-to-AC voltage inverter 14 includes six half phase modules 18, 20, 22, 24, 26, and 28 that are paired to form three phases 30, 32, and 34. Each phase 30, 32, 34 is coupled to a pair of conductors 36, 38 of DC bus 16. An electromechanical device or motor 40 is coupled to bi-directional DC-to-AC voltage inverter 14. In one embodiment, electromechanical device 40 is a traction motor mechanically coupled to one or more driving wheels or axles 42 of a vehicle (not shown) or other electrical apparatus including cranes, elevators, or lifts. Electromechanical device 40 includes a plurality of windings 44, 46, and 48 having a plurality of conductors 50 coupled to respective phases 30, 32, 34 of bi-directional DC-to-AC voltage inverter 14. Windings 44-48 also have a plurality of conductors 52 coupled together to form a node 54.

Traction system 10 includes a controller 56 coupled to half phase modules 18-28 via lines 58. Controller 56, through appropriate control of half phase modules 18-28, is configured to control bi-directional DC-to-AC voltage inverter 14 to convert a DC voltage or current on DC bus 16 to an AC voltage or current for supply to windings 44-48 via conductors 50. Accordingly, the DC voltage or current from first energy storage device 12 may be converted into an AC voltage or current and delivered to motor 40 to drive wheels 42. In other non-vehicle propulsion systems, the drive wheels 42 may be another type of load (not shown), including a pump, fan, winch, crane, or other motor driven loads. In a regenerative braking mode, electromechanical device 40 may be operated as a generator to brake wheels 42 and to supply AC voltage or current to bi-directional DC-to-AC voltage inverter 14 for inversion into a DC voltage or current onto DC bus 16 that is suitable for recharging first energy storage device 12.

When a vehicle or apparatus incorporating traction system 10 is parked or not in use, it may be desirable to plug the vehicle into, for example, the utility grid or to a renewable energy source to refresh or recharge energy storage device 12. Accordingly, FIG. 1 shows an embodiment of the invention including a charging system 60 coupled to traction system 10 for the recharging of energy storage device 12 such that components of traction system 10 may be used for the dual purposes of recharging energy storage device 12 and converting energy from energy storage devices 12 into energy usable to drive the load or propel the vehicle.

Charging system 60 includes an external, high-impedance voltage source 62 having a plurality of conductors 64 coupled to a rectifier 66 and coupled to a receptacle or plug 68 having contacts 70, 72. While external high-impedance voltage source 62 is shown as a poly-phase utility system in FIGS. 1-3 having three phases, it is contemplated that the external, high-impedance poly-phase source could instead have one, two, six, or any other number of phases. Plug 68 is configured to mate with a plug 74 of traction system 10 having contacts 76, 78. High-impedance voltage source 62 includes secondary windings 80. As shown in FIG. 3 hereinbelow, it is to be understood that source 62 would also include primary windings not shown in FIG. 1 that are coupleable to a source such as the utility grid. Plug 74 is coupled to node 54, and each winding 44-48 of motor 40 provides filtering for the charging energy supplied by high-impedance voltage source 62.

In a re-charging operation, charging energy, such as current, flows from high-impedance voltage source 62 through rectifier 66, windings 44-48, and diodes 82, 84, 86 of respective half phase modules 18, 22, 26 to charge bus 16 during a first stage of the re-charging operation. The charging energy from charge bus 16 flows into first energy storage device 12, which, in one embodiment, has an instantaneous acceptance capability that is larger than an instantaneous delivery capability of the high-impedance voltage source 62. The charging energy is limited at least by an impedance of high-impedance voltage source 62. Diodes 82-86 are rated to allow current from the high impedance voltage source 62 to flow directly into first energy storage device 12 during the first stage. In this embodiment, diodes 88, 90, 92 of respective half phase modules 20, 24, 28 are not configured to supply charging energy directly from first energy storage device 12 to the charging bus 16. Accordingly, diodes 88-92 may have a lower current rating than diodes 82-86 and may, therefore, allow for reduced costs of traction system 10.

Returning to the re-charging operation, controller 56 is programmed or configured to monitor the charging energy supplied to first energy storage device 12 during the first stage. Since, in one embodiment, current of the charging energy during the first stage is greater than the current ratings of the components of bi-directional DC-to-AC voltage inverter 14 except for diodes 82-86, the charging energy flows only through diodes 82-86 during the first stage. As the voltage rises in first energy storage device 12, charging current tapers back. Controller 56 is configured to monitor the current of the charging energy via a current sensor 94. While shown as sensing current flow between winding 48 and diode 86, it is contemplated that current sensor 94 may be placed anywhere in traction system 10 such that current from the charging energy source may be sensed.

Controller 56 compares the monitored charging energy current to a pre-determined threshold value. In one embodiment, the threshold value is a value of the charging energy current that falls within a current rating of all the components of bi-directional DC-to-AC voltage inverter 14. The threshold value may also be based on a design and a temperature of first energy storage device 12. Once controller 56 detects that the threshold value has been crossed, controller 56 begins active control of bi-directional DC-to-AC voltage inverter 14 during a second stage of the re-charging operation. In this manner, re-charging of first energy storage device 12 during the first stage allows for rapid charging that is limited primarily via the impedance of high-impedance voltage source 62. During the second stage, charging is controlled due to the components of bi-directional voltage modification assembly 14.

During the second stage, controller 56 controls half phase modules 18-28 to boost the current and/or voltage of the charging energy supplied thereto such that first energy storage device 12 may be re-charged to a voltage greater than that allowable through direct re-charging via high-impedance voltage source 62 without boosting. Respective pairs of half phase modules 18-20, 22-24, 26-28 form individual boost converters that may operate at the same phase to reduce or eliminate high-frequency torque ripple in motor 40. Furthermore, windings 44-48 act as boost inductors during the boosting operations.

Controller 56 senses a voltage of first energy storage device 12 via a voltage sensor 96 and regulates charging of first energy storage device 12 such that its voltage does not exceed a specified level. Near the end of charging, controller 56 also regulates the re-charging voltage on DC bus 16 to a "float voltage" as the re-charging current tapers to low levels.

Figure 2:
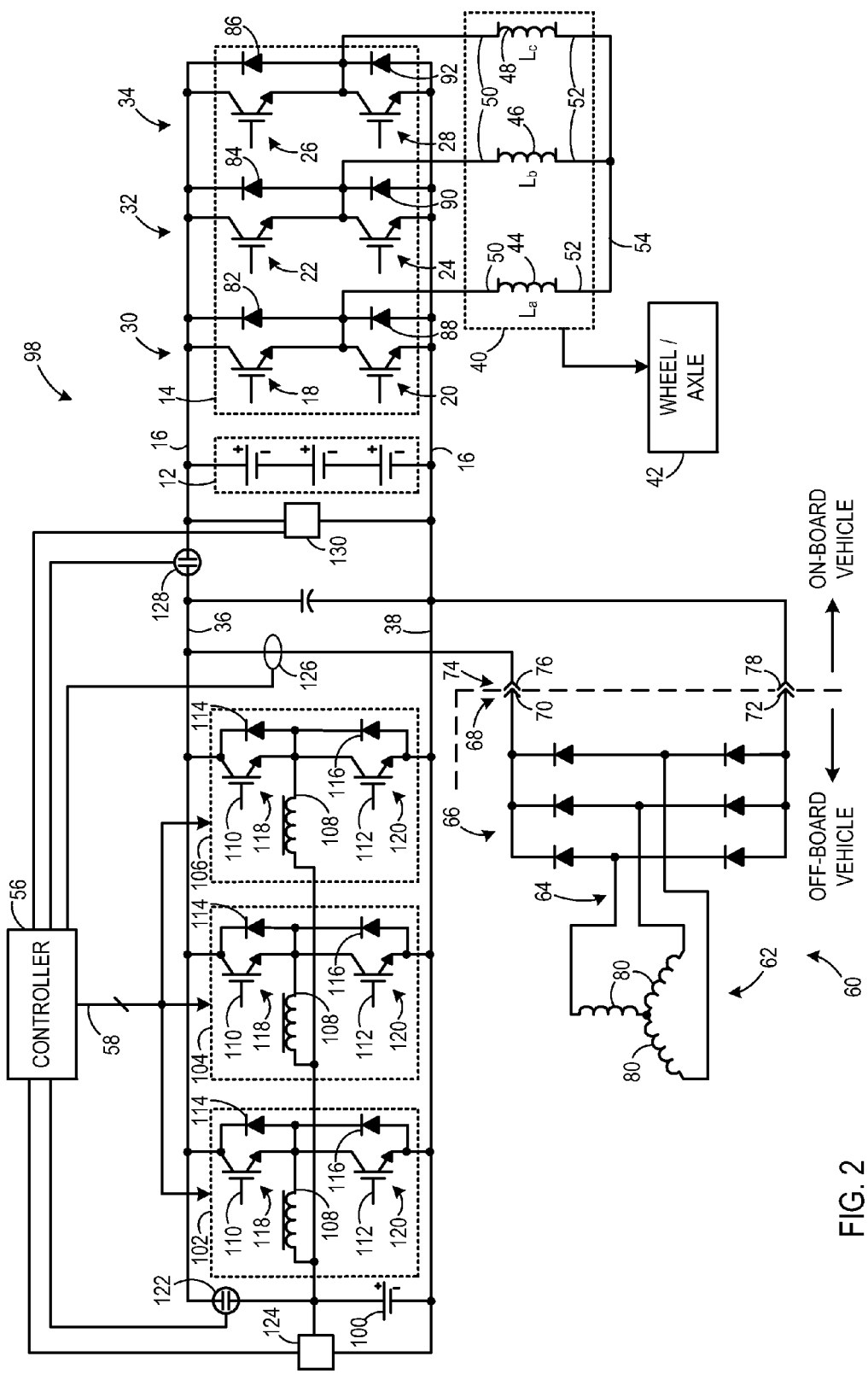
FIG. 2 is a schematic diagram of another traction system according to an embodiment of the invention.
Figure 3:
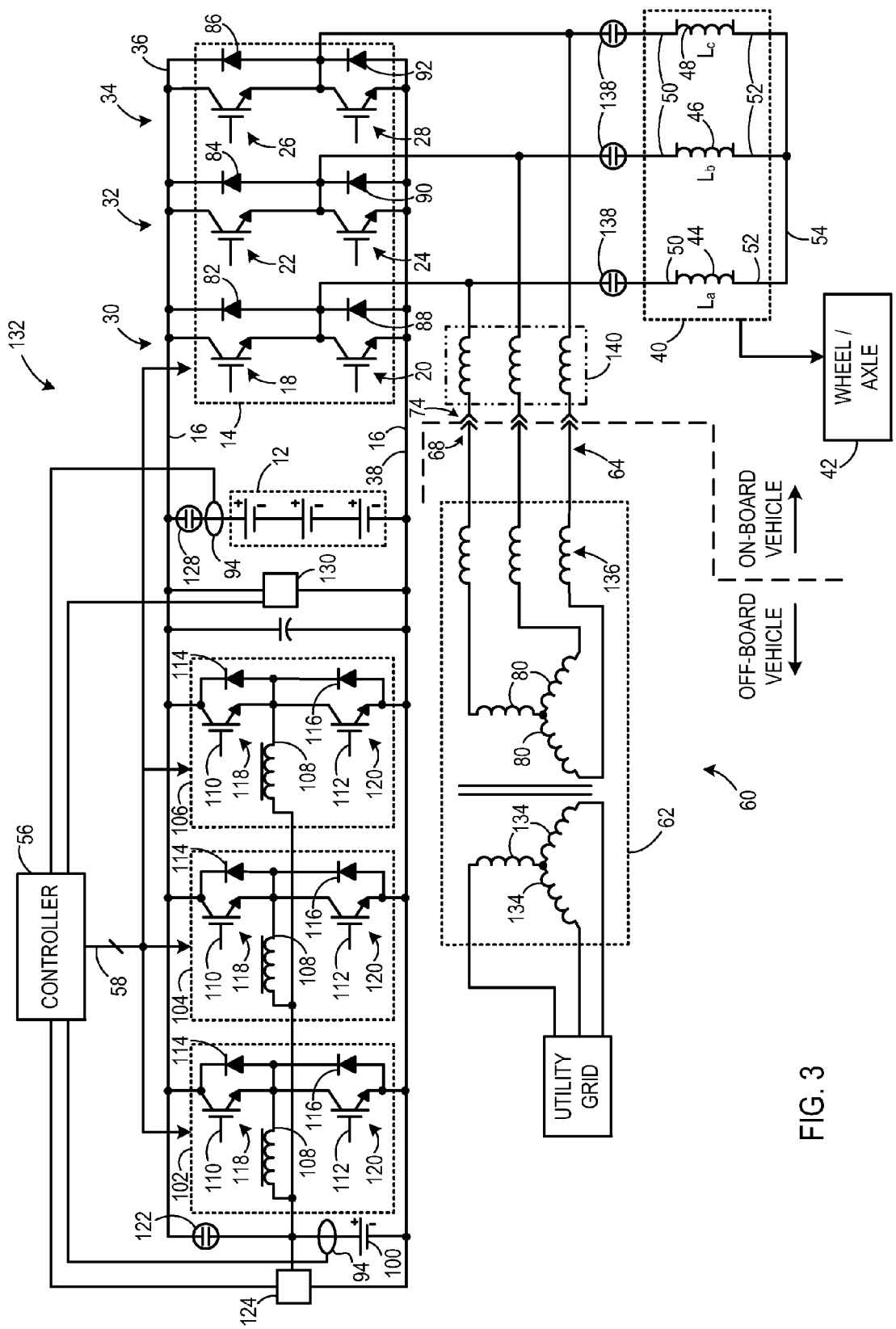
FIG. 3 is a schematic diagram of another traction system according to an embodiment of the invention.

FIG. 2 shows a schematic diagram of a traction system 98 according to another embodiment of the invention. Elements and components common to traction systems 10 and 98 will be discussed relative to the same reference numbers as appropriate. FIG. 3 will also discuss common components relative to the same reference numbers. In addition to the components common with traction system 10, traction system 98 includes a second energy storage device 100 coupled to DC bus 16 to provide power to drive wheels 42. In one embodiment, second energy storage device 100 is a low-voltage energy storage device and may be a battery, a fuel cell, an ultracapacitor, or the like. First energy storage device 12 may be configured to provide a higher power than second energy storage device 100 to provide power during, for example, acceleration periods of the vehicle. Second energy storage device 100 may be configured to provide a higher energy than first energy storage device 12 to provide a longer-lasting power to the vehicle to increase a travelling distance thereof.

A plurality of bi-directional DC-to-DC voltage converters 102, 104, 106 are coupled to second energy storage device 100 and to DC bus 16 and are configured to convert one DC voltage into another DC voltage. Each bi-directional DC-to-DC voltage converter 102-106 includes an inductor 108 coupled to a pair of switches 110, 112 and coupled to a pair of diodes 114, 116. Each switch 110, 112 is coupled to a respective diode 114, 116, and each switch/diode pair forms a respective half phase module 118, 120. Switches 110, 112 are shown, for illustrative purposes, as insulated gate bipolar transistors (IGBTs). However, embodiments of the invention are not limited to IGBTs. Any appropriate electronic switch can be used, such as, for example, metal oxide semiconductor field effect transistors (MOSFETs), bipolar junction transistors (BJTs), and metal oxide semiconductor controlled thyristors (MCTs).

Controller 56 is coupled to bi-directional DC-to-DC voltage converters 102-106 via lines 58, and energy supplied via second energy storage device 100 is boosted by control of switches 110, 112 of bi-directional DC-to-DC voltage converters 102-106 to supply the higher voltage to DC bus 16. The energy supplied via second energy storage device 100 to DC bus 16 is inverted via bi-directional DC-to-AC voltage inverter 14 and supplied to motor electromechanical device 40. Similarly, energy generated during a regenerative braking mode may also be used to re-charge second energy storage device 100 via bi-directional DC-to-AC voltage inverter 14 and via bucking control of switches 110, 112 of bi-directional DC-to-DC voltage converters 102-106.

As shown in FIG. 2, charging system 60 is coupled to DC/charge bus 16. A first switch or contactor 122 is coupled between second energy storage device 100 and charging bus 16. In a re-charging operation, controller 56, which is coupled to switch 122, causes switch 122 to close, thus allowing charging energy from high-impedance voltage source 62 to flow directly into second energy storage device 100. In one embodiment, second energy storage device 100 has an instantaneous acceptance capability that is larger than an instantaneous delivery capability of the high-impedance voltage source 62. During the first stage of charging, controller 56 monitors the charging voltage supplied to second energy storage device 100 via a voltage sensor 124.

Controller 56 compares the monitored charging voltage to a pre-determined threshold value. In one embodiment, the threshold value is a value of the voltage of second energy storage device 100. The threshold value may also be based on a design and a temperature of second energy storage device 100. Since the instantaneous acceptance capability of second energy storage device 100 is larger than the instantaneous delivery capability of the high-impedance voltage source 62, controller 56 monitors the voltage of second energy storage device 100 such that its rated voltage is not exceeded. Accordingly, controller 56 compares the monitored voltage of second energy storage device 100 to a voltage threshold value that has been pre-determined to be an optimal value to switch the re-charging operation to a second stage.

After the voltage threshold value has been crossed, controller 56 causes switch 122 to open and begins active control of bi-directional DC-to-DC voltage converters 102-106 to buck the voltage of the charging energy supplied thereto such that second energy storage device 100 may be more slowly re-charged at a controlled and regulated pace to a desired re-charge level. Controller 56 operates plurality of bi-directional DC-to-DC voltage converters 102-106 such that a "float voltage" of second energy storage device 100 may be maintained while current of the charging energy flowing into second energy storage device 100 tapers to low levels. A current sensor 126 allows controller 56 to set the current of the charging energy to "top off" the energy stored in second energy storage device 100.

A switch or contactor 128 may also be coupled to conductor 36 to de-couple first energy storage device 12 from charge bus 16 during the re-charging operation if desired. When the nominal voltage of the first and second energy storage devices 12, 100 are appropriately selected and the respective State of Charge (SOC) of each respective energy storage device 12, 100 is within predetermined values, switch 128 may also be closed during the re-charging operation so that first energy storage device 12 may be simultaneously re-charged along with second energy storage device 100 as described below. Since charging energy is coupled directly to charge bus 16, bi-directional DC-to-AC voltage inverter 14 is not used to boost the charging energy to re-charge first energy storage device 12 to a maximum level. A voltage sensor 130 coupled to controller 56 allows controller 56 to monitor the charging of first energy storage device 12.

In another embodiment, second energy storage device 100 may have an instantaneous acceptance capability that is smaller than the instantaneous delivery capability of the high-impedance voltage source 62. Controller 56 may determine the instantaneous acceptance capability of second energy storage device 100, for example, by measuring its SOC. In this embodiment, controller 56 leaves switch 122 in its open state and actively controls bi-directional DC-to-DC voltage converters 102-106 to buck the voltage of the charging energy on charging bus 16 to regulate the voltage that is supplied to second energy storage device 100 to a threshold or pre-determined value such that the desired threshold or re-charge level of second energy storage device 100 may be controlled at a regulated pace. Control of bi-directional DC-to-DC voltage converters 102-106 allows controller 56 to regulate the maximum current applied to second energy storage device 100 to a desired or maximum limit based on the design or parameters of second energy storage device 100.

When the desired threshold or re-charge level of second energy storage device 100 has been reached in the embodiments described herein, controller 56 may be programmed to terminate all stages of recharging.

FIG. 3 shows a schematic diagram of a traction system 132 according to another embodiment of the invention. Elements and components common to traction systems 10, 98 and 132 will be discussed relative to the same reference numbers as appropriate. As shown, high-impedance voltage source 62 includes a plurality of primary windings 134 coupled to secondary windings 80. Primary windings 134 may be coupled to the utility grid. A plurality of inductors 136 is coupled to secondary windings 80. It is to be understood that high-impedance voltage source 62 as shown in FIG. 3 is applicable to the high-impedance voltage sources 62 shown in FIGS. 1 and 2.

High-impedance voltage source 62 is coupled to bi-directional DC-to-AC voltage inverter 14. However, unlike that shown in FIG. 1, plug 74 is coupled to bi-directional DC-to-AC voltage inverter 14 between diodes 82-86 and windings 44-48. A plurality of switches or contactors 138 is coupled to windings 44-48 such that, during a re-charging operation when charging system 60 is coupled to traction system 132, motor 40 may be de-coupled therefrom so that the charging energy does not electrically excite or supply energy to motor 40 and therefore motor 40 does not cause the vehicle to move during charging.

In this embodiment, charging system 60 does not have a separate rectifier 66. Instead, diodes 82-92 provide the rectification to convert the AC power supplied via high-impedance voltage source 62 to DC power for charge bus 16. In this embodiment, all diodes 82-92 are rated to allow current from the charging energy on charge bus 16 to flow directly into first or second energy storage devices 12, 100 during the first stage.

Similar to that described above with respect to FIG. 1, in a re-charging operation, charging energy flows from high-impedance voltage source 62 through diodes 82-92 to charge bus 16 during a first stage of the re-charging operation. The charging energy from charge bus 16 flows into first energy storage device 12 and into second energy storage device 100, as described below. Controller 56 monitors and compares the monitored charging energy as described above to independently determine when to change the re-charging operation to the second stage for each energy storage device 12, 100. A plurality of inductors 140 (shown in phantom) may be included to assist the transformer leakage inductance, represented by windings 136, during the boosting operations if desired. It is contemplated that fraction systems 10, 98 or FIGS. 1 and 2 may also include inductors 140 to assist transformer leakage inductance during the boosting operations if desired.

If contactor 122 is open and contactor 128 is closed, then energy storage device 12 is charged directly from high-impedance voltage source 62 while energy storage device 100 is charged by bi-directional converters 102, 104, and 106 operating in buck mode, thus both energy storage device 12 and 100 can be charged simultaneously. If contactor 128 is open and contactor 122 is closed, then energy storage device 100 is charged directly from high-impedance voltage source 62 just as described above in FIG. 2 during stage 1. When stage 2 is entered, contactor 122 opens, and stage 2 continues with the bi-directional converters 102, 104, and 106 controlling charge while operating in a buck mode. Energy storage device 12 could then be charged at a later time either from high-impedance voltage source 62 with contactor 122 open and contactor 128 closed or, if the high-impedance voltage source 62 is unplugged from traction system 132, directly from energy storage device 100 (which typically has significantly more energy than energy storage device 12) through bidirectional converters 102, 104, and 106 operating in boost mode. Bi-directional converters 102, 104, and 106 can be operated with their switching phases shifted so as to reduce voltage and current ripple levels in both energy storage devices.

In another embodiment of the invention, during the charging of energy storage device 100 while in the second stage or mode of operation, with 128 closed, controller 56 operates DC-AC inverter 14 to control or regulate voltage on DC charge bus 16 to a threshold value as sensed using voltage sensor 130 using energy supplied by AC voltage source 62. Energy storage device 100 is capable of simultaneously being charged through control of bidirectional converters 102, 104, and 106, or a subset thereof, operating in the buck mode.

Embodiments of the invention thus use components such as inverters, converters, filters and/or machine inductance already on-board a traction control system to recharge one or more energy storage devices of the traction control system. In this manner, these components may be used for the dual purposes of motoring and recharging the energy storage devices. Using the on-board components of the vehicles allows for off-board charging stations to have a simple, low cost, high-power design. In addition, a high-current charging may be obtained in a cost effective manner. Rapid, fast charging of the on-board energy storage devices may be thus accomplished such that a large current flows into the energy storage devices in a first re-charging stage that is mainly limited by impedance of a voltage transformer without initial current control by electronic switching elements having higher current limiting properties.

A technical contribution for the disclosed apparatus is that it provides for a controller implemented technique for transferring energy using onboard power electronics.

According to one embodiment of the invention, an apparatus comprises a first energy storage device configured to output a DC voltage, a first bi-directional voltage modification assembly coupled to the first energy storage device, and a charge bus coupled to the first energy storage device and to the first bi-directional voltage modification assembly. The apparatus also comprises high-impedance voltage source coupleable to the charge bus and a controller configured to monitor a transfer of charging energy supplied from the high-impedance voltage source to the first energy storage device. The controller is also configured to compare the monitored transfer of charging energy with a threshold value and, after the threshold value has been crossed, control the first bi-directional voltage modification assembly to modify one of a voltage and a current of the charging energy supplied to the first energy storage device.

In accordance with another embodiment of the invention, a method comprises coupling a battery to a first voltage bus, the battery configured to output a DC voltage, coupling a first bi-directional voltage modification assembly to the first voltage bus and coupling a second voltage bus to the first voltage bus, the second voltage bus configured to receive charging energy from a high-impedance voltage source and to supply the charging energy to one of the first bi-directional voltage modification assembly and the first voltage bus. The method also comprises configuring a controller to monitor a transfer of the charging energy to the battery, compare the monitored transfer of charging energy with a threshold value, and, after the threshold value has been crossed, control the first bi-directional voltage modification assembly to modify one of a voltage and a current of the charging energy supplied to the battery.

In accordance with yet another embodiment of the invention, a system comprises a charge bus configured to receive charging energy from a voltage source, an energy storage device configured to output a DC voltage and coupled to the charge bus, a first bi-directional voltage modification assembly coupled to the charge bus and a controller. The controller is configured to monitor a transfer of the charging energy supplied to the energy storage device, compare the monitored transfer of charging energy with a threshold comprising one of a voltage of the energy storage device and an average rectified line voltage of the charge bus, and, after the threshold has been crossed, control the first bi-directional voltage modification assembly to modify one of a voltage and a current of the charging energy supplied to the first energy storage device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
   an energy storage device configured to output a DC voltage;
   a bi-directional voltage modification assembly coupled to the energy storage device;
   a charge bus coupled to the energy storage device and to the bi-directional voltage modification assembly, the charge bus coupleable to a high-impedance voltage source; and
   a controller configured to:
      monitor a transfer of charging energy supplied from the high-impedance voltage source to the energy storage device; and
      modify one of a voltage and a current of the charging energy supplied to the energy storage device based on the monitored transfer of charging energy.

2. The apparatus of claim 1 wherein the high-impedance voltage source comprises:
   a plurality of secondary transformer windings;
   a rectifier bridge coupled to the plurality of secondary transformer windings.

3. The apparatus of claim 1 wherein the controller is configured to compare the monitored transfer of charging energy to a threshold and base the modification of the one of the voltage and the current on the comparison.

4. The apparatus of claim 3 wherein the controller, in being configured to compare the monitored transfer of charging energy with the threshold value, is configured to compare a current of the charge bus with a predetermined current threshold value.

5. The apparatus of claim 1 wherein the energy storage device comprises a high power energy storage device having an instantaneous acceptance capability larger than an instantaneous delivery capability of the high-impedance voltage source;
   wherein the bi-directional voltage modification assembly comprises a bi-directional DC-AC voltage inverter; and
   wherein the controller is configured to control the bi-directional voltage modification assembly to modify the one of the voltage and the current, and the bi-directional DC-AC voltage inverter is configured to boost the one of the voltage and the current of the charging energy.

6. The apparatus of claim 5 wherein the controller, in being configured to control the bi-directional voltage modification assembly, is configured to control a plurality of boost converters of the bi-directional DC-AC voltage inverter at a same phase.

7. The apparatus of claim 5 wherein the bi-directional DC-AC voltage inverter comprises a plurality of diodes configured to transfer a current of the charging energy from the high-impedance voltage source to the charge bus before a threshold value has been crossed.

8. The apparatus of claim 1 wherein the energy storage device comprises a low power energy storage device having an instantaneous acceptance capability larger than an instantaneous delivery capability of the high-impedance voltage source;
   wherein the apparatus comprises a bi-directional DC-DC voltage converter; and
   wherein the bi-directional DC-DC voltage converter is configured to buck the one of the voltage and the current of the charging energy.

9. The apparatus of claim 8 further comprising a switch having an open position and a closed position;
   wherein the switch, when positioned in a first position, is configured to couple the low power energy storage device directly to the charge bus;
   wherein the switch, when positioned in a second position, is configured to de-couple the low power energy storage device directly to the charge bus; and
   wherein the controller is further configured to cause the switch to change from the first position to the second position after a threshold value has been crossed, wherein the threshold value is based on one of a voltage and a temperature of the low power energy storage device.

10. The apparatus of claim 8 further comprising a bi-directional DC-AC voltage inverter coupled to the bi-directional DC-DC voltage converter and to the charge bus, wherein the bi-directional DC-AC voltage inverter is configured to transfer charging energy from the high-impedance voltage source to the charge bus.

11. The apparatus of claim 10 further comprising:
   a high power energy storage device having an instantaneous acceptance capability larger than an instantaneous delivery capability of the high-impedance voltage source; and
   wherein the controller is further configured to boost the voltage of the charging energy via the bi-directional DC-AC voltage inverter.

12. The apparatus of claim 11 wherein the controller is further programmed to simultaneously charge the low power energy storage device and the high power energy storage device.

13. The apparatus of claim 8 wherein the controller is configured to compare the monitored transfer of charging energy with a threshold value, and is configured to compare an energy storage device voltage of the charge bus with a predetermined voltage threshold value.

14. The apparatus of claim 1 wherein the energy storage device comprises a low power energy storage device having an instantaneous acceptance capability smaller than an instantaneous delivery capability of the high-impedance voltage source;
   wherein the apparatus comprises a bi-directional DC-DC voltage converter;
   wherein the bi-directional DC-DC voltage converter is configured to buck one of the voltage and the current of the charging energy.

15. The apparatus of claim 1 wherein each of the energy storage device, the bi-directional voltage modification, and the controller is positioned on a vehicle.

16. The apparatus of claim 1 wherein the high-impedance voltage source comprises one of a single-phase high-impedance voltage source, a two-phase high-impedance voltage source, a three-phase high-impedance voltage source, and a six-phase high-impedance voltage source.

17. A method of fabricating an energy transfer system for transferring energy between an energy storage device on-board a vehicle and an external source, the method comprising:

coupling the energy storage device to a voltage bus, the energy storage device configured to output a DC voltage;

coupling a bi-directional voltage modification assembly to the voltage bus;

coupling a high-impedance voltage source to the voltage bus to supply current to the energy storage device; and configuring a controller to:
monitor a transfer of the current to the energy storage device; and
after a threshold current has been crossed, control the bi-directional voltage modification assembly to modify the current supplied to the energy storage device.

18. The method of claim 17 wherein coupling the bi-directional voltage modification assembly to the voltage bus comprises coupling a bi-directional DC-AC voltage inverter to the voltage bus; and
wherein configuring the controller to control the bi-directional voltage modification assembly comprises configuring the controller to boost a voltage output of the bi-directional DC-AC voltage inverter.

19. The method of claim 17 wherein coupling the bi-directional voltage modification assembly to the voltage bus comprises coupling a bi-directional DC-DC voltage converter to the voltage bus; and
wherein configuring the controller to control the bi-directional voltage modification assembly comprises configuring the controller to buck a voltage of the charging energy via the bi-directional DC-DC voltage converter.

20. A system comprising:
a charge bus configured to receive charging energy from a high-impedance voltage source;
an energy storage device configured to output a DC voltage and coupled to the charge bus;
a bi-directional voltage modification assembly coupled to the charge bus; and
a controller configured to:
transfer charging energy from the high-impedance voltage source to the energy storage device via a first electrical configuration of the bi-directional voltage modification assembly; and
after a threshold rate of charging energy has been crossed, alter the bi-directional voltage modification assembly to a second electrical configuration to modify the rate of charging energy supplied from the high-impedance voltage source to the energy storage device.

21. The system of claim 20 wherein the voltage source comprises a high-impedance voltage source.

22. The system of claim 20 wherein the bi-directional voltage modification assembly comprises a bi-directional DC-AC voltage inverter; and
wherein the controller, in being configured to control the bi-directional voltage modification assembly, is configured to boost a voltage of the charging energy via the bi-directional DC-AC voltage inverter.

23. The system of claim 20 wherein the bi-directional voltage modification assembly comprises a bi-directional DC-DC voltage converter; and
wherein the controller, in being configured to control the bi-directional voltage modification assembly, is configured to buck a voltage of the charging energy via the bi-directional DC-DC voltage converter.

24. The system of claim 20 further comprising an electrical apparatus configured to house the charge bus, the energy storage device, the bi-directional voltage modification assembly, and the controller, wherein the electrical apparatus comprises one of a vehicle, a crane, an elevator, and a lift.

* * * * *